UNITED STATES PATENT OFFICE.

ALBERT COBENZL, OF HÖCHST-ON-THE-MAIN, GERMANY, ASSIGNOR TO THE FARBWERKE, VORMALS MEISTER, LUCIUS & BRÜNING, OF SAME PLACE.

BLUE DYE.

SPECIFICATION forming part of Letters Patent No. 578,093, dated March 2, 1897.

Application filed December 21, 1896. Serial No. 616,535. (Specimens.) Patented in Germany September 19, 1895, No. 86,971; in France December 12, 1895, No. 252,415, and in England December 12, 1895, No. 23,853.

*To all whom it may concern:*

Be it known that I, ALBERT COBENZL, a citizen of the Empire of Austria-Hungary, residing at Höchst-on-the-Main, in the Empire of Germany, have invented a new and useful Improvement in the Manufacture of a Blue Dyestuff, (for which Letters Patent were granted to me in Germany, No. 86,971, dated September 19, 1895; in France, No. 252,415, dated December 12, 1895, and in Great Britain, No. 23,853, dated December 12, 1895,) of which the following is a specification.

I have found that a blue basic dyestuff may be obtained by heating diethylsafranin (the product of the oxidation of diethylparaphenylenediamin and two molecules of anilin) with paraphenylenediamin under pressure and in presence of an appropriate indifferent solvent.

Example: Fifty kilograms of diethylsafranin (obtained from diethylparaphenylenediamin and anilin) are heated together with three hundred liters of an aqueous solution containing twenty-five kilograms of paraphenylenediamin in a closed vessel under pressure kept in motion by an agitator for from four to five hours at a temperature of 180° centigrade until the reddish-violet safranin color disappears.

The product of the reaction is boiled with an additional quantity of water and the necessary quantity of hydrochloric acid, by which means the complete solution without any residue takes place. The new dyestuff is then precipitated either by the addition of zinc chlorid or sodium acetate or carbonate. The new dyestuff is obtained in the form of a brownish-black powder which is soluble in in water and alcohol with a pure blue color. It is soluble in concentrated sulfuric acid with a green color and turns, on adding water, first to a pure blue and then to a reddish blue. It is quite insoluble in ether, benzene, and ligroine. From the aqueous solution of the dyestuff are separated from the color-base blue flakes on adding a caustic alkali or ammonia. The dyestuff gives, in printing and dyeing, blue tints which excel by their special purity and great fastness to light and alkalies.

Having thus described my invention, I claim as new and desire to protect by Letters Patent—

1. The process herein described of producing a blue basic dyestuff, which consists in heating diethylsafranin with paraphenylenediamin in presence of an indifferent solvent, substantially as set forth.

2. The process herein described of producing a blue basic dyestuff which consists in heating diethylsafranin obtained from diethylparaphenylenediamin and anilin with paraphenylenediamin under pressure and in presence of an indifferent solvent, substantially as described.

3. As a new product, the blue dyestuff obtained by heating diethylsafranin with paraphenylenediamin in the presence of an indifferent solvent, said dyestuff being a brownish-black powder, soluble in water and alcohol with a pure blue color; in concentrated sulfuric acid with a green color, turning on addition of water first to a pure blue and then to a reddish blue; being insoluble in ether, benzene and ligroine, and separating from its aqueous solution on addition of a caustic alkali or ammonia blue flakes from its color-base, substantially as set forth.

In testimony that I claim the foregoing as my invention I have signed my name in presence of two subscribing witnesses.

ALBERT COBENZL.

Witnesses:
HEINRICH HAHN,
ALFRED BRISBOIS.